United States Patent [19]

Howkins

[11] Patent Number: 4,646,106

[45] **Date of Patent: * Feb. 24, 1987**

[54] METHOD OF OPERATING AN INK JET

[75] Inventor: Stuart D. Howkins, Ridgefield, Conn.

[73] Assignee: Exxon Printing Systems, Inc., Brookfield, Conn.

[ * ] Notice: The portion of the term of this patent subsequent to Jul. 10, 2001 has been disclaimed.

[21] Appl. No.: 576,582

[22] Filed: Feb. 3, 1984

Related U.S. Application Data

[63] Continuation-in-part of Ser. No. 336,603, Jan. 4, 1982, Pat. No. 4,459,601, which is a continuation-in-part of Ser. No. 229,994, Jan. 30, 1981, abandoned, and a continuation-in-part of Ser. No. 384,131, Jun. 1, 1982, Pat. No. 4,509,059.

[51] Int. Cl.[4] .............................................. G01D 15/18

[52] U.S. Cl. ................................ 346/1.1; 346/140 R

[58] Field of Search ............................ 346/1.1, 140 R

[56] References Cited

U.S. PATENT DOCUMENTS

| | | | |
|---|---|---|---|
| 3,287,579 | 11/1966 | Borner et al. | 310/8.2 |
| 3,452,360 | 6/1969 | Williamson | 346/140 |
| 3,683,212 | 8/1972 | Zoltan | 346/75 |
| 3,683,396 | 8/1972 | Keur et al. | 346/140 |
| 3,708,118 | 1/1973 | Keur | 239/102 |
| 3,747,120 | 7/1973 | Stemme | 346/75 |
| 3,828,357 | 8/1974 | Koeblitz | 346/140 |
| 3,832,579 | 8/1974 | Arndt | 310/8.1 |
| 3,840,758 | 10/1974 | Zoltan | 310/8.1 |
| 3,848,118 | 11/1974 | Rittberg | 239/101 |
| 3,878,519 | 4/1975 | Eaton | 346/1 |
| 3,893,131 | 7/1975 | Perel et al. | 346/140 |
| 3,898,673 | 8/1975 | Haskell | 346/140 |
| 3,900,162 | 8/1975 | Titus et al. | 239/102 |
| 3,940,773 | 2/1976 | Mizoguchi et al. | 346/140 |
| 3,946,398 | 3/1976 | Kyser et al. | 346/140 |
| 3,961,337 | 6/1976 | Jung et al. | 346/140 |
| 3,988,745 | 10/1976 | Sultan | 346/140 |
| 4,016,571 | 4/1977 | Yamada | 346/75 |
| 4,021,818 | 5/1977 | Van Vloten | 346/140 |
| 4,024,544 | 5/1977 | Vernon | 346/140 |
| 4,032,929 | 6/1977 | Fischbeck et al. | 346/140 |
| 4,034,380 | 7/1977 | Isayama | 346/140 |
| 4,037,230 | 7/1977 | Fujimoto et al. | 346/75 |
| 4,045,801 | 8/1977 | Iwasaki | 346/140 |
| 4,045,802 | 8/1977 | Fukazawa et al. | 346/140 |
| 4,046,961 | 9/1977 | Brown | 179/1 |

List Continued on next page.

FOREIGN PATENT DOCUMENTS

| | | |
|---|---|---|
| 46676 | 3/1982 | European Pat. Off. . |
| 143637 | 11/1979 | Japan . |

OTHER PUBLICATIONS

Cross, R. G., Ribbonless Ink Printer: IBM TDB, vol. 16, No. 1, Jun. 1973, p. 310.

Lee et al., High Speed Droplet Generator: IBM TDB, vol. 15, No. 3, Aug. 1972, p. 909.

Naylor et al., Ink Jet High-Voltage Power Supply: IBM TDB, vol. 15, No. 4, Sep. 1972, pp. 1371–1372.

Brownlow et al.: Ink on Demand Using Silicon Nozzles; IBM TDB, vol. 19, No. 6, Nov. 1976, pp. 2255–2256.

Durbeck et al.: Drop-On-Demand Nozzle Arrays with High Frequency Response, IBM TDB, vol. 21, No. 3, Aug. 1978, pp. 1210–1211.

*Primary Examiner*—Joseph W. Hartary

[57] ABSTRACT

An ink jet includes a variable volume chamber with an ink droplet ejecting orifice. The volume of the chamber is varied by a transducer which expands and contracts in a direction having at least a component extending parallel with the axis ink droplet ejection from the orifice. The transducer communicates with a moveable wall of the chamber which has a sufficiently small are a such that the difference in the pressure pulse transit times from each point on the wall to the ink droplet ejection orifice is less than 1 microsecond.

16 Claims, 11 Drawing Figures

U.S. PATENT DOCUMENTS

| | | | |
|---|---|---|---|
| 4,047,183 | 9/1977 | Taub | 346/1 |
| 4,057,807 | 11/1977 | Fischbeck et al. | 346/140 |
| 4,068,144 | 1/1978 | Toye | 310/327 |
| 4,072,958 | 2/1978 | Hayami et al. | 346/140 |
| 4,072,959 | 2/1978 | Elmqvist | 346/140 |
| 4,104,646 | 8/1978 | Fischbeck | 346/140 |
| 4,112,433 | 9/1978 | Vernon | 346/1 |
| 4,115,789 | 9/1978 | Fischbeck | 346/140 |
| 4,119,034 | 10/1978 | Wax | 346/140 |
| 4,126,867 | 11/1978 | Stevenson, Jr. | 346/140 |
| 4,131,899 | 12/1978 | Chrostou | 346/140 |
| 4,150,384 | 4/1979 | Meece | 346/75 |
| 4,161,670 | 7/1979 | Kern | 346/140 X |
| 4,183,030 | 1/1980 | Kaieda et al. | 346/140 |
| 4,184,169 | 1/1980 | Taylor et al. | 346/140 |
| 4,189,734 | 2/1980 | Kyser et al. | 346/1.1 |
| 4,228,440 | 10/1980 | Harike et al. | 346/75 |
| 4,229,751 | 10/1980 | Tamai | 346/140 |
| 4,233,610 | 11/1980 | Fischbeck et al. | 346/140 |
| 4,272,200 | 6/1981 | Hehl | 400/124 |
| 4,282,535 | 8/1981 | Kern | 346/140 |
| 4,284,996 | 8/1981 | Greve | 346/140 |
| 4,367,478 | 1/1983 | Larsson | 346/140 |
| 4,380,018 | 4/1983 | Andoh | 346/140 |
| 4,383,264 | 5/1983 | Lewis | 346/140 |
| 4,398,204 | 8/1983 | Dietrich | 346/140 |
| 4,471,363 | 9/1984 | Hanaoka | 346/140 |

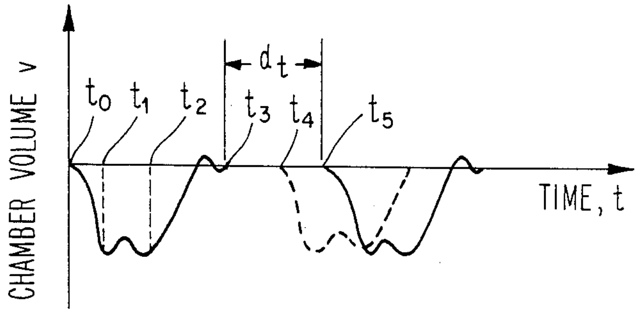
Fig. 1
(PRIOR ART)
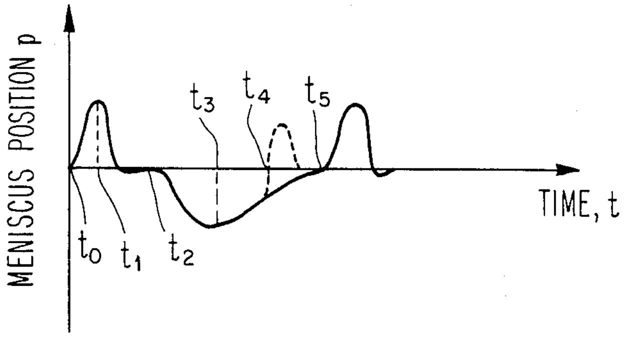
Fig. 2
(PRIOR ART)
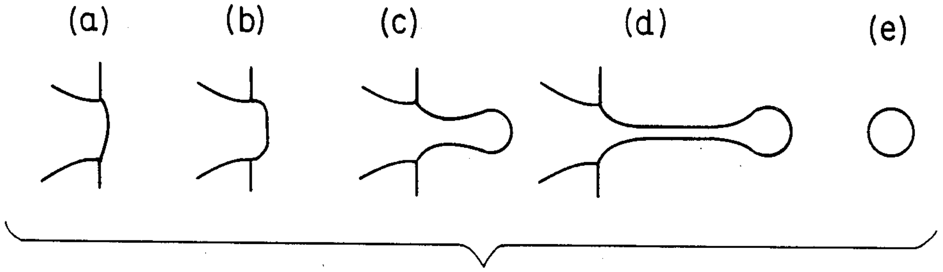
Fig. 3
(PRIOR ART)
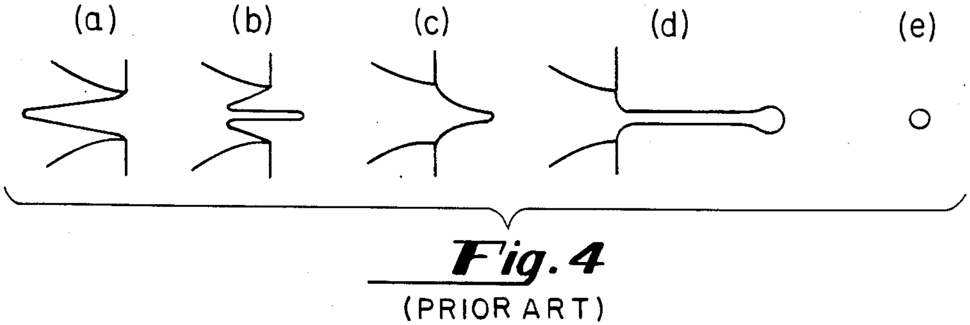
Fig. 4
(PRIOR ART)
Fig. 5
(PRIOR ART)
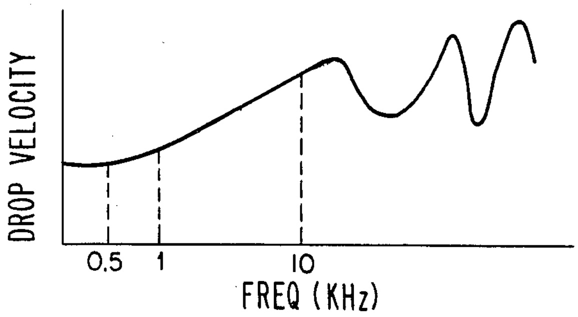

METHOD OF OPERATING AN INK JET

RELATED APPLICATIONS

This is a continuation-in-part of application Ser. No. 336,603, filed Jan. 4, 1982, now U.S. Pat. No. 4,459,601 which in turn is a continuation-in-part of application Ser. No. 229,994, filed Jan. 30, 1981 now abandoned. This application is also a continuation-in-part of application Ser. No. 384,131, filed June 1, 1982 now U.S. Pat. No. 4,509.059.

BACKGROUND OF THE INVENTION

This invention relates to ink jets, and more particularly, to ink jets of the demand type or impulse type.

Ink jets of the demand type include a transducer which is coupled to a chamber adapted to be supplied with ink. The chamber includes an orifice for ejecting droplets of ink when the transducer has been driven or pulsed by an appropriate drive voltage. The pulsing of the ink jet abruptly reduces the volume of the jet so as to advance the meniscus away from the chamber and form a droplet of ink from that meniscus which is ejected from the ink jet.

Demand ink jets typically operate by reducing or contracting the volume of the chambers in the rest state to a lesser volume in the active state when a droplet is fired. This contraction in the active state is followed by an expansion of the volume when the jet is returned to the rest state and the chamber is filled. Such a mode of operation may be described as a fire-before-fill mode.

FIG. 1 depicts chamber volume v as a function of time t in a demand ink jet operating in a fire-before-fill mode. Referring to FIG. 1, the time $t_0$ represents the onset of the active state of the ink jet whereupon the volume of ink is reduced rapidly until time $t_1$. This rapid reduction in volume produces the projection of a droplet on or about time $t_1$. The contracted volume of the chamber continues with slight fluctuation until time $t_2$ whereupon the contracted volume begins to expand until time $t_3$. At time $t_3$ marking the beginning of a rest state, the volume of the chamber is identical to that at time $t_0$.

As shown in FIG. 1, the rest state continues for time $d_t$; between times $t_3$ and $t_5$ whereupon an active state is initiated resulting in the projection of another droplet. Operation at high droplet projection rates or frequencies will necessitate very short dead times $d_t$ corresponding to the inactive state. In other words, it may be necessary to initiate the active state so as to again contract the volume of the chamber at an earlier time $t_4$ as depicted by dotted lines in FIG. 1. Generally speaking, higher droplet projection rates and/or frequencies are desirable but achieving such rates and/or frequencies with demand ink jets operating in a fire-before-fill mode as depicted by the waveform in FIG. 1 may create difficulties which will now be discussed with respect to FIGS. 2 through 4.

FIG. 2 depicts the meniscus position p as a function of time as the demand ink jet discussed with respect to FIG. 1 moves between the rest and active states. In this connection, it will be understood that the times $t_0$ through $t_5$ of FIG. 2 are conincident with the times $t_0$ through $t_5$ of FIG. 1 and the meniscus position p as depicted in FIG. 2 is a function of the chamber volume v as depicted in FIG. 1.

At time $t_0$, the meniscus position p is at equilibrium corresponding with the position of the meniscus when the ink jet is in the rest state. As the ink jet moves into the active state and the chamber volume v contracts rapidly between times $t_0$ and $t_1$, the meniscus position moves forward resulting in the ultimate ejection of a droplet of ink at time $t_1$. Immediately upon ejection of the droplet at time $t_1$, the meniscus position p returns essentially to an equilibrium state as shown at time $t_2$ while the volume v is still in the contracted state. At time $t_2$, when the chamber volume v is expanding back to the volume of the ink jet in the rest state, the meniscus position retracts and is still in the retracted position at time $t_3$ when the active state of the ink jet has terminated.

During the rest state corresponding to the dead time $d_t$, the meniscus position advances back to the equilibrium position corresponding to the position of the meniscus in the rest state. As shown in FIG. 2, $t_5$ has been chosen such that the meniscus position at time $t_5$ has had an opportunity to return to the equilibrium position prior to the onset of the next active state and the ejection of another droplet of ink. However, if the next active state were to begin at time $t_4$ resulting in the firing of a droplet of ink, the meniscus position would not yet have returned to the equilibrium state and the meniscus would abruptly advance at time $t_4$ as shown in FIG. 2 with the result that the meniscus would reach a somewhat different position than the meniscus reached as a result of delaying the onset of the active state until time $t_5$.

This variation in the position of the meniscus as a function of the duration of the dead time $d_t$ produces a variation in the droplet size and velocity which is undesirable in achieving the optimum in ink jet printing. The adverse effects with respect to droplet size may be readily appreciated with reference to FIGS. 3 and 4.

As shown in FIG. 3, a droplet of ink is fired when the meniscus is in an initial equilibrium position as shown in FIG. 3*a*. In particular, FIG. 3*a* shows a meniscus in the position depicted in FIG. 2 at time $t_5$ FIGS. 3*b* through 3*d* show the advancement of the meniscus following time $t_5$ including the formation of a droplet. FIG. 3*e* shows the ultimate droplet ejected.

If, however, the meniscus is at least partially retracted as at time $t_4$ depicted in FIG. 4(*a*), a droplet of somewhat different size is formed as depicted by FIGS. 4*b* through 4*e*. More particularly, the formation of a droplet at the center of the meniscus in FIG. 4*b* results in a somewhat smaller droplet as depicted by FIG. 4*e*.

It will, therefore, be appreciated by reference to FIGs. 3 and 4 that droplets of different size may be generated utilizing a typical demand ink jet as a function of the dead time $d_t$ or duration of the rest state. Where high droplet projection rates or frequencies are desired, diminution of the dead time $d_t$ or duration of the active state will produce smaller droplets. On the other hand, larger droplets will be produced where the duration of the rest state or dead time $d_t$ is of some threshold duration.

FIG. 5 depicts a difference in velocity as a function of frequency which in turn is a function of the dead time $d_t$. As shown, the droplet velocity increases from 0 kHz. up to 7 kHz. In other words, as the dead time dt is shortened so as to increase frequency, the droplet velocity varies as shown in FIG. 5.

There is an additional problem associated with the typical demand ink jet, i.e., a fire-before-fill jet. In many instances, such a jet will fire with the meniscus in the equilibrium state. Such a position is not particularly efficient from an operating standpoint since a greater volume contraction is necessary to generate a droplet of the same size and velocity because of the fluidic impedance of the droplet as compared with a droplet which is projected from a retracted meniscus wherein the fluidic impedance of the orifice is lessened.

Finally, the typical fire-before-fill demand ink jet suffers from an instability of the drop break off process. When the drop emerges from the orifice upon contraction of the chamber volume from an unretracted meniscus position which is necessary to avoid variations in droplet velocity and size, the droplet is more likely to attach to the edge of the orifice. This creates drop aiming problems which may be caused by geometric imperfections in the orifice edge. Firing from the equilibrium position of the meniscus is also more likely to result in ink spillover which will wet the face of the orifice as the droplet emerges also creating irregularities in droplet projection. Another disadvantage of such spillover is the probability of paper dust adhering to the jet face and causing a failure.

SUMMARY OF THE INVENTION

It is an object of this invention to provide a method of operating a demand ink jet wherein droplets of the same size are generated at various frequencies or projection rates.

It is also an object of this invention to provide a method for operating a demand ink jet wherein the same droplet velocity is achieved for various frequencies or droplet projection rates.

It is a further object of this invention to provide a method for operating a demand ink jet with greater operating efficiency.

It is a still further object of this invention to provide a method of operating a demand ink jet capable of high frequency and/or droplet projection rates.

It is a still further object of this invention to provide a demand ink jet characterized by stability in the drop break off process.

It is another object of this invention to provide a method of operating a demand ink jet wherein drop aiming is optimized.

It is yet a further object of this invention to provide a method of operating a demand ink jet wherein the spilling over of ink and the wetting of the face of an orifice is minimized.

In accordance with this invention, an ink jet apparatus comprises a variable volume chamber including an ink droplet ejecting orifice and means for increasing the pressure in the chamber so as to eject a droplet of ink on demand over a range of operating frequencies.

In accordance with one important aspect of the invention, the apparatus is characterized by at least one resonant frequency creating an upper limit for a frequency range of stable operation for said apparatus, said at least one resonant frequency exceeding 10 KHz. Preferably, the resonant frequency is less than 100 KHz and lies within the range of 25 to 50 KHz.

In accordance with these and other objects of the invention, a preferred embodiment of the invention comprises a method of operating a demand ink jet including an ink jet chamber and orifice. The method includes the steps of initiating filling at the conclusion of the rest state and the onset of the active state and continuing filling during the active state. Firing is initiated near the conclusion of the active state and completed at the conclusion of the active state and at the onset of the rest state.

In the preferred embodiment of the invention, the meniscus is maintained in an equilibrium position while the jet is in the rest state. The meniscus is then retracted during filling from the equilibrium position to a retracted position during the active state. Firing is initiated while the meniscus is in the retracted position near the conclusion of the active state. Firing is completed while returning the meniscus to the equilibrium position at the conclusion of the active and at the onset of the rest state.

In accordance with one important aspect of the invention, the meniscus is retracted to substantially the same retracted position for each droplet to be fired.

In accordance with another important aspect of the invention, the duration of the rest state may vary upwardly from zero without changing the droplet size and/or velocity.

In accordance with another important aspect of the invention, the retracted position of the meniscus at the time of initiating firing is synchronously controlled such that the meniscus is in a predetermined position at the time of firing.

In accordance with another important aspect of the invention, a fixed time duration is maintained between initiating filling and initiating firing. Preferably, the fixed time duration is greater than 5 and less than 500 $\mu$sec with a time duration of 10 to 75 $\mu$sec preferred.

In accordance with another important aspect of the invention, the meniscus of the ink jet is controlled so as to produce droplets of substantially constant size and velocity over a range of frequencies extending from zero to 5 kHz. and preferably 7 kHz.

BRIEF DESCRIPTION OF THE DRAWINGS

FIG. 1 is a waveform diagram representing chamber volume as a function of time in prior art ink jets;

FIG. 2 is a diagrammatic waveform representing meniscus position as a function of time in prior art ink jets;

FIG. 3(*a–e*) and FIG. 4(*a–e*) represent the excitation of a meniscus and the formation of a droplet as a function of initial meniscus position;

FIG. 5 is a diagrammatic representation of drop velocity as a function of frequency in prior art ink jets;

DETAILED DESCRIPTION OF THE PREFERRED EMBODIMENT

Figure 6:
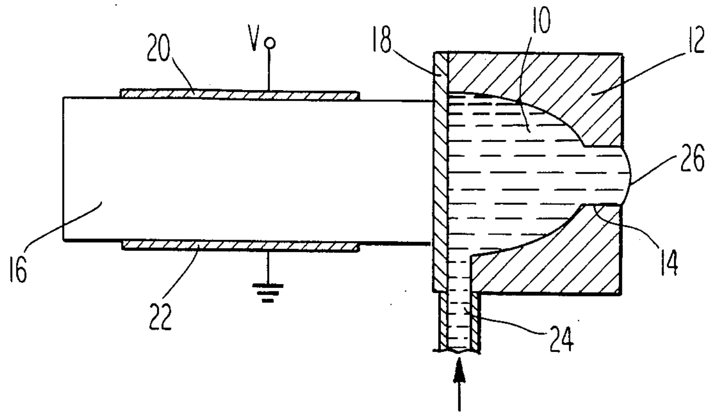
FIG. 6 is a partially schematic, cross-sectional view of an ink jet capable of operating in accordance with this invention where the jet is in the rest state.

FIG. 6 discloses a demand ink jet representing a preferred embodiment of the invention. The jet includes a variable volume chamber 10 formed within a housing 12 which includes an orifice 14. The transducer 16 is coupled to the chamber 10 through a diaphram 18. The volume of the chamber is varied in response to the state of energization of the transducer 16 which is controlled by the application of an electric field as a result of a drive voltage V applied between an electrode 20 connected to a supply of the voltage V and an electrode 22 connected to ground.

A supply port 24 supplies ink to the chamber 10. A meniscus of ink 26 is formed at the orifice 14. As the volume of the chamber 10 expands and contracts decreasing and increasing the pressure within the chamber respectively, the meniscus 26 moves into and out of the chamber 10 respectively.

As shown in FIG. 6, the ink jet is in the rest or inactive state. In this state, the transducer 16 is unenergized and the diaphram 18 is substantially undeformed such that the volume of the chamber 10 is substantially uncontracted. In the inactive or rest state, the meniscus 26 is in a position of equilibrium as shown in FIG. 6.

Figure 7:
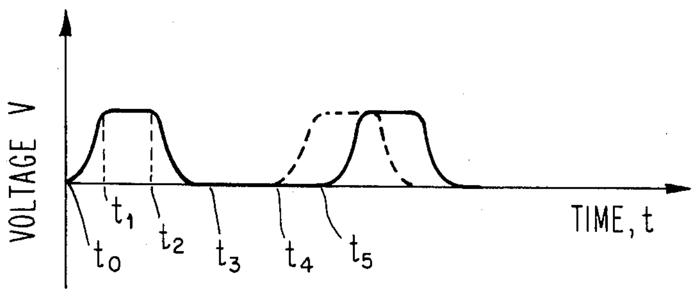
FIG. 7 is a diagrammatic representation of a transducer voltage as a function of time for an ink jet operated in accordance with this invention.

By applying a voltage V such as that shown in the waveform of FIG. 7, the ink jet shown in FIG. 6 may be activated so as to project droplets from the orifice 14. More particularly, a voltage V is applied to the electrodes 20 and 22 as depicted by the waveform of FIG. 7 at time $t_0$ so as to change the ink jet from the rest state to the active state. The active state continues though times $t_1$ and $t_2$ to time $t_3$ while the voltage waveform as shown in FIG. 7 is applied.

At time $t_3$, the voltage waveform goes to zero as shown in FIG. 7 and the rest or inactive state is resumed until time $t_5$ when the voltage waveform again becomes positive so as to place the ink jet in the active state.

Figure 8:
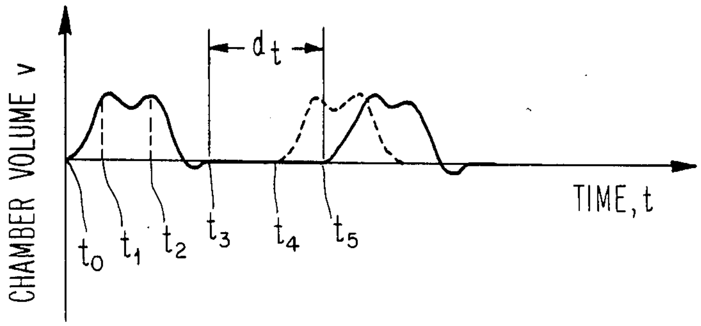
FIG. 8 is a diagrammatic representation of chamber volume as a function of time for an ink jet operated in accordance with this invention.

The voltage waveform as depicted in FIG. 7 produces the changes in volume of the chamber 10 as depicted by FIG. 8 with concommitant changes in pressure within the chamber 10. More particularly, the volume of the chamber expands and the pressure decreases beginning at time $t_0$ at the onset of the active state and the conclusion of the rest state with the maximum volume of the chamber occurring at times $t_1$ and $t_2$. During this time, filling of the chamber occurs. By time $t_3$, the voltage V applied to the electrodes 20 and 22 of the ink jet as shown in FIG. 6 has been reduced to zero such that the volume of the chamber 10 suddenly returns to the volume existing during the rest state with a rapid increase in pressure. Firing of a droplet occurs coincident with this increase in pressure. The volume remains constant until time $t_5$ when a positive voltage is again applied to electrodes 20 and 22 so as to expand the volume of the chamber with a resultant reduction in the pressure within the chamber. During the time between $t_3$ and $t_5$, the ink jet is in the rest state for a duration of dead time designated $d_t$.

In accordance with this invention, the duration of the time $d_t$ may be varied without adversely affecting the operation of the ink jet, i.e., the firing of droplets of ink. More particularly, the positive-going voltage of waveform may be applied beginning at time $t_4$ rather than $t_5$ with a resulting increase in the expansion of the volume of the chamber beginning at time $t_4$ rather than time $t_5$. This, in turn, will result in a shortened dead time $d_t$.

Because the ink jet is operated in a fill-before-fire mode, i.e., filling is initiated at the conclusion of the rest state and the onset of the active state rather than initiating firing at the conclusion of the rest state and the onset of the active state, the drop velocity and size will not vary. In other words, droplet size and velocity are substantially constant. In this connection, it will be appreciated that filling and not firing is initiated at time $t_0$ and time $t_5$. In contrast, a fire-before-fill mode of operation as depicted in FIG. 1 would result in firing at time $t_0$ rather than filling.

Figure 9:
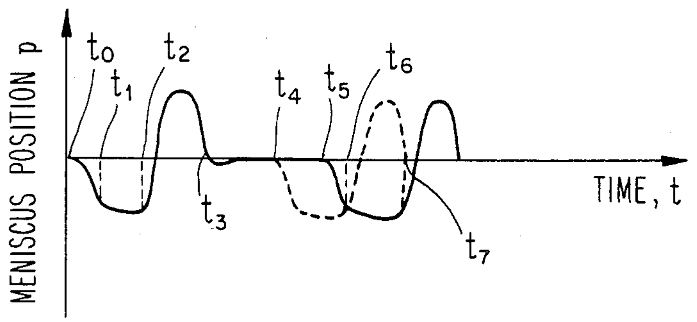
FIG. 9 is a diagrammatic representation of meniscus position as a function of time for an ink jet operated in accordance with this invention.

The particular reasons for achieving uniform droplet velocity and size may be best appreciated by reference to FIG. 9 wherein it will be seen that the position of the meniscus is always in a state of retraction at the onset of firing which occurs at time $t_2$ as time $t_7$. Moreover, firing is initiated not only when the meniscus is retracted but when the meniscus is in substantially the same retracted position. In other words, the degree of retraction is controlled so that the meniscus is always in the same retracted position at the onset of firing as shown in FIG. 4 to assure uniformity in droplet size and droplet velocity. This is accomplished by synchronizing firing at times $t_2$ and $t_7$ with the filling beginning at times $t_0$ and $t_5$, i.e., there is a fixed time duration between filling and firing regardless of droplet projection rates or frequencies.

Referring again to FIG. 9, it will be seen that the duration of the dead time $d_t$ which varies with frequency has no adverse effect on the position of the meniscus at the time of firing. If the rest state ends and the active state begins at time $t_5$, the meniscus will be in the position shown at time $t_7$ when firing of the droplet is initiated. On the other hand, if the rest state ends at time $t_4$ and the dead time $d_t$ is shortened accordingly, the meniscus is in an identical position at time $t_6$. As a consequence, droplet velocity and size will necessarily remain substantially constant since the meniscus is in the same position regardless of the duration of the dead time dt. In terms of the position of the meniscus 26 shown in FIG. 10, the meniscus will be in the same position whether the active state begins at time $t_5$ or an earlier time $t_4$.

Figure 11:
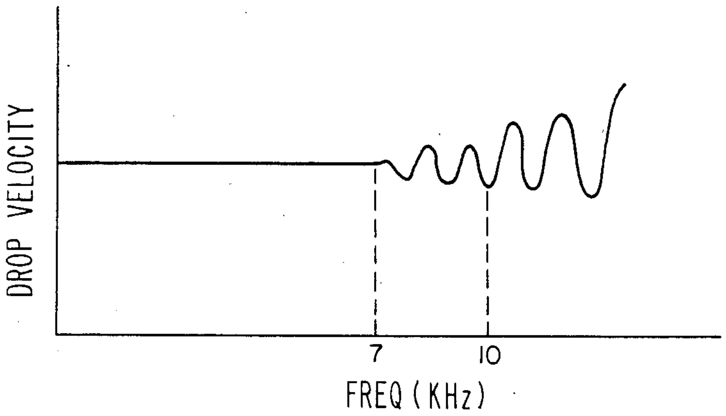
FIG. 11 is a diagrammatic representation of drop velocity as a function of frequency in an ink jet operated in accordance with this invention.

FIG. 11 depicts a substantially constant droplet velocity over a predetermined frequency range extending upwardly from zero kHz. Preferably, the droplet velocity is substantially constant from zero to 5 kHz. with a constant velocity up to 7 kHz. preferred. Above 7 kHz. as shown in FIG. 11, the velocity may vary as a result of the phasing of the transducer resonance which is excited by firing.

Variations in the volume of ink as a function of time have been discussed with respect to FIG. 8 with these variations producing the change in meniscus as a function of time as shown in FIG. 9. As mentioned previously, the variations in volume produce changes in pressure within the chamber. For example, as the volume within the chamber contracts, the pressure is increased. On the other hand, if the volume expands, the pressure is decreased.

By comparing FIGS. 1 and 2 with FIGS. 8 and 9, it will be appreciated that a fill-before-fire mode of operation in accordance with this invention is advantageous as compared with a fire-before-fill mode since the meniscus is always in a retracted position regardless of the frequency. In the fire-before-fill mode as depicted in FIG. 2, the meniscus is not in a retracted position at the time of initiating firing, i.e., at time $t_5$, where the dead time dt exceeds some predetermined limit. Obviously, at the time of initiating firing after a long rest state, the meniscus will be in the same position as shown in FIG. 2 at time $t_5$. Thus, the meniscus will not be retracted. On the other hand, the meniscus is always retracted in a fill-before-fire mode as depicted in FIG. 9 since the meniscus must be retracted before firing can occur even after the end of a rest state.

It will also be observed with reference to FIG. 9 that the meniscus always returns to the unretracted equilibrium state as soon as firing is completed. Since the meniscus always retracts from the equilibrium state at the time of filling, the amount of meniscus retraction is always equal and the meniscus position at the time of firing is, therefore, always the same from droplet to droplet.

As shown in FIG. 9, the time duration between time $t_0$ and $t_2$ is the same as the duration of the time between time $t_5$ and $t_7$ or between time $t_4$ and $t_6$. These time durations correspond to the time lapse between initiating filling and initiating firing. By making these the lapses substantially equal and thereby synchronizing firing with filling, the meniscus position at the time of initiating firing is repeatable so as to assure uniform droplet size and velocity.

It will, therefore, be appreciated that this invention involves the controlling of the retracted meniscus position prior to firing so as to achieve uniformity in droplet velocity and size. As described herein, this uniformity in droplet size and velocity is achieved in the preferred embodiment of the invention by establishing a fixed time duration between the initiation of filling and the initiation of firing. This time duration is preferably greater than 5 but less than 500 μsec. For example, a time duration of 10 to 75 μsec has been found to be particularly desirable.

By assuring that the meniscus is always fired from a retracted position, greater jet operating efficiency is achieved as the overall orifice channel length is effectively shortened resulting in reduced fluidic impedance. As a consequence, less transducer displacement is necessary to generate a drop of given size and velocity.

As discussed above, droplet repetition rate in a fire-before-fill mode is limited by the time required for the meniscus to recover to equilibrium upon cessation of the volume displacement cycle unless differences in droplet size and velocity can be tolerated. In the fill-before-fire mode of this invention, less liquid volume is pulled from the orifice during expansion of the chamber and is driven outwardly through the orifice during contraction of the chamber. This is because the meniscus, being in equilibrium at the start of the cycle, presents a higher fluidic impedance to expansion than to contraction. The difference between the volume driven out through the orifice on contraction and the volume pulled in through the orifice on expansion constitutes a portion, or possibly all, of the drop volume that will not need to be refilled after cessation of the volume displacement cycle. Elimination of the refill requirement permits shorter dead times $d_t$ between volume displacement cycles and hence higher repetition rates.

Finally, when a droplet emerges from an initial retracted meniscus position, attachment of the emerging droplet to the orifice edge is avoided. This reduces the tendency toward drop misaim that can be caused by geometric imperfection in the orifice edge and it also reduces the tendency of ink to spill over and wet the face as the droplet is emerging which can also result in misaim.

As was described in the foregoing, a droplet is projected outwardly from a meniscus as the meniscus moves forward from a retracted position as shown in FIG. 3(*a–e*). It will be understood that the term droplet is not intended to denote or connote a necessarily spherical volume of ink. Rather, the volume of ink may be elongated as in the form of a ligament.

Figure 10:
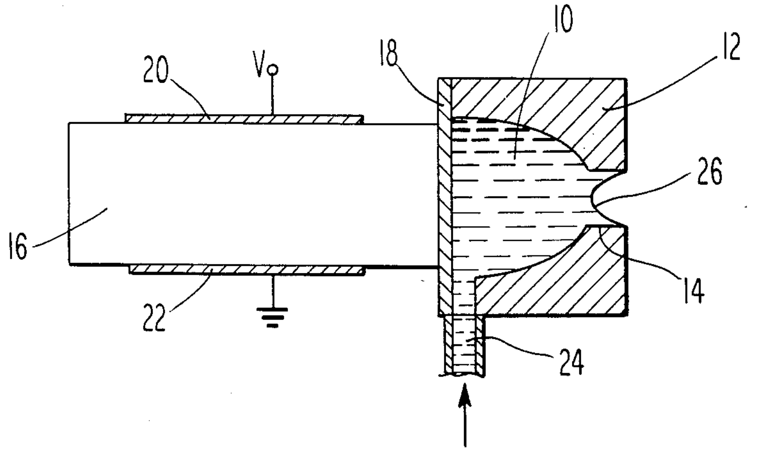
FIG. 10 is a partially schematic, cross-sectional diagram of the ink jet of FIG. 6 in the active state.

It will also be understood that the particular configuration of the ink jet chamber and the orifice may vary. For example, a slightly modified orifice and chamber may be utilized wherein the chamber walls taper into the orifice walls rather than the more abrupt juncture of the walls as depicted in FIGS. 1 and 10. Regardless of the configuration of the walls in the orifice, the meniscus moves between an equilibrium state as depicted in FIG. 6 and a retracted state as depicted in FIG. 10. This and other structural details of an ink jet well suited for the use in practicing this invention is set forth in the aforesaid copending application Ser. No. 336,603, filed Jan. 4, 1982 which is incorporated herein by reference. The aforesaid application Ser. No. 384,131, filed June 1, 1982 describes a method and apparatus for controlling the position of the meniscus such that the meniscus is always in the same position at the time of initiating firing of each droplet and this application is also incorporated herein by reference.

The term active state and the term rest state have been utilized. It is not intended that the term active state will necessarily connote the application of a potential across the transducer, nor is the term rest state intended to connote the absence of such a potential across the transducer. Rather, the active state is intended to connote the quiescent state of the ink jet to which the device returns during dead time when there is no demand for a droplet of ink. On the other hand, the active state is that period of time coinciding with demand for a droplet of ink.

In accordance with another important aspect of the invention, the stable operation of the ink jet is achieved such that each of the droplets ejected from the orifice of the chamber have a substantially predetermined velocity over a frequency range of zero to five KHz. Preferably a substantially predetermined velocity is maintained for frequencies exceeding five KHz. For example, it is preferred that a substantially predetermined velocity be maintained over a frequency range from zero to a frequency in excess of five KHz, preferably at least up to seven KHz.

In accordance with another important aspect of the invention, the ink jet apparatus is operated by initiating filling by decreasing the pressure within the chamber and retracting the meniscus as the pressure is decreased. Firing is then initiated by increasing the pressure within the chamber when the meniscus is retracted, moving the meniscus forward through the orifice while the pressure is increased, so as to first form and then project a droplet outwardly from the orifice. The retracted position of the meniscus is controlled in the orifice when initiating firing so as to project droplets at a substantially equal velocity and/or to project droplets of substantially equal size.

In accordance with this invention, it is desirable to achieve a very high frequency of operation of the ink jet. It has been found that a desirably high frequency of operation may be achieved if the chamber of the ink jet is sufficiently small so as to have a high Helmholtz (i.e., liquid) resonant frequency s defined by the following equation:

$$f = \frac{1}{2\pi}\sqrt{\frac{L_n + L_i}{(C_c + C_d)(L_nL_i)}}$$

Where $C_c$ is the compliance associated with the ink volume in the chamber $C_d$ is the compliance of the movable wall $L_n$ is the inertance of the liquid in the nozzle $L_i$ is the inertance of the liquid in the inlet restrictor.

Further explicit expressions of $C_c$, $L_n$ and $L_i$ are:

$$C_c = V/pc^2$$

Where V is the volume of the chamber, p is the density of the ink, and c is the velocity of sound in the ink.

$$L_n = \frac{4pl_n}{3\pi r^2}$$

Where:

$1_n$ is the length of the nozzle r is the radius of the nozzle.

$$L_i = \frac{kpl_i}{nA}$$

Where k is a shape factor determined by the cross-section shape of the restrictor channels;

A is the cross-sectional area of a single restrictor channel.

n is the number of restrictor channels; and $l_i$ is the length of a single restrictor channel.

In general, it has been found desirable to have a charateristic Helmholtz resonant frequency which is substantially higher than the rate of ink droplet ejection. Preferably, the Helmholtz resonant frequency is at least twice the rate of ink droplet ejection. In numerical terms, it is desirable to have a Helmholtz frquency of at least 10 KHz and less than 100 KHz with 25 KHz to 50 KHz preferred so as to permit high droplet ejection rates on a demand basis.

From the foregoing, it will be appreciated that it is generally desirable to achieve a small chamber to achieve a high Helmholtz resonant frequency so as to permit a high droplet ejection rate on a demand basis. However, the ejection droplet rate and jet stability regardless of Helmholtz resonant frequency can be adversely affected by undesirably small or low acoustic resonant frequencies of the chamber or undesirably small or low transducer resonant frequencies along the axis of coupling, e.g., longitudinal or length mode resonant frequencies of the transducers 16. Accordingly, it is desirable to assure that the overall length of the chamber does not greatly exceed the maximum cross-sectional dimension of the chamber, e.g., diameter in the case of a cylindrical chamber. As used herein, the term overall length of the chamber defines the length parallel with the axis of droplet ejection from the rear of the chamber remote from the orifice to the exterior of the orifice itself. This is represented by the distance X whereas the maximum cross-sectional dimension is represented by the dimension Y.

In general, it is considered desirable to achieve an aspect ratio, i.e., a ratio of length to the cross-sectional dimension of no more than 5 to 1 with no more than 2 to 1 preferred. It will also be understood that the length may be less than the cross-section dimension. By utilizing this aspect ratio, the acoustic resonant frequency of the chamber (i.e., organ pipe resonance) will remain sufficiently high such that the acoustic resonant frequency of the chamber does not unduly limit the operating frequency of stable operation of the jet.

It will also be appreciated that there is a certain minimum cross-sectional dimension which can be achieved without requiring an increase in the overall length of the transducer which would in turn decrease the axial or length mode resonant frequency of the transducer therby limiting the operating frequency of the demand jet. A minimum cross-sectional sectional dimension of 0.6 mm is desirable so as to maximize the axial or length mode resonant frequency. In this regard, it will be appreciated that the overall length of the transducer would necessarily increase in order to achieve the necessary displacement as the maximum cross-sectional dimension of the chamber is reduced.

As noted previously, it is desirable to couple the transducer into the chamber as a point source. In this regard, it is preferred that the difference in pressure pulse transit times from each point on the transducer coupling wall be less than 1 microsecond and preferably less than 0.1 microsecond and 0.05 microsecond represents an optimum. Assuming a give ink composition and therefore a predetermined acoustic velocity trhough the ink within a chamber, the difference in acoustic path length or distance $d_{max}$ less $d_{min}$ may be determined for a given high frequency acoustic disturbance. In this regard, it will be appreciated that it may be desirable to operate ink jets with high frequency components present of at least 100 KHz and preferably 1 MKHz. Assuming an acoustic velocity in water and a high frequency component of 100 KHz, the difference in acoustic path length or distance $d_{max}$ minus $d_{min}$ should not exceed 1.5 mm (60 mils) and is preferably less than 0.15 mm (6 mils). Assuming a 1 MHz frequency component, the difference in path lengths should not exceed 0.15 mm (6 mils).

The following examples of chambers of various dimensions are provided to illustrate various aspects of the invention:

EXAMPLE 1

X=2.54 mm (100 mils)
Y=1.78 mm (70 mils)
acoustic velocity $1.5\times10^5$ cm/sec
high frequency component of 1 MHz

EXAMPLE 2

X=2.54 mm (100 mils)
Y=1.60 mm (63 mils)
acoustic velocity $1.2\times10^5$ cm/sec
(oil base ink) high frequency component of 1 MHz

EXAMPLE 3

X=1.27 mm (50 mils)
Y=1.27 mm (50 mils)
acoustic velocity $1.5\times10^5$ cm/sec
high frequency component of 1 MHz From the foregoing, it will be appreciated that the cross-sectional dimension of the chamber 10 must be sufficiently large to achieve a sufficiently high Helmholtz frequency vis-a-vis the operating frequency of the jet and yet sufficiently small vis-a-vis the acoustic resonant frequency and the longitudinal or length mode resonant frequency of the transducer 16. In this connection, it has been found that the cross-sectional dimension of the chamber transverse to the axis of droplet ejection should be at least ten times greater than the cross-sectional dimension of the orifice transverse to the axis of droplet ejection. Dimensionally, consideraing a cross-sectional dimension of the orifice in the range of 0.025 mm to 0.075 mm, i is preferred that the cross-sectional dimension of the chamber exceeds 0.6 mm and preferably lies in the range of 0.6 mm to 1.3 mm.

In accordance with another important aspect of the invention, the length of the chamber 10 is short so as not to undesirably reduce the Helmholtz frequency into the operating frequency range. At the same time, the relatively short chamber creates a relatively high acoustic resonant frequency. As shown, the overall axial length of the transducer is such that the acoustic resonant frequency is more than the longitudinal or length mode resonant frequency of the transducer.

In general, it is preferred that the resonant freqquency along the axis of coupling of the transducer, e.g., the longitudinal resonant frequencies of the transducers be at least 25% greater than the Helmholtz frequency. Preferably, the resonant frequency along the axis of coupling is at least 50% greater than the Helmholtz frequency.

By utilizing the cylindrical transducer 16, the number of resonant modes of the transducer are desirably reduced. However, it will be appreciated that other transducers may be utilized which expand along the direction of elongation but are not of cylindrical cross-section, e.g., rectangular cross-section transducers having an overall length to miniumum width ratio not exceeding 30 to 1 and a thickness transverse to the length in the range of 0.4 to 0.6 mm.

It will also be appreciated that the overall size of the inlet 24 must bear a certain relationship with the ink jet orifice. In this connection, it is desirable that the minimum cross-sectional dimension of the restrictor be maintained so as to be less than or equal to the nozzle diameter or cross-sectional dimension. This will assure a Helmholtz frequency greater than the operating frequency but less than the length mode or acoustic resonant frequency.

In the foregoing, it has been emphasized that this invention provides an ink jet with a Helmholtz (fluidic) resonant frequency that is less than the transducer length mode resonant frequency and preferably one-half of that frequency. At the same time, the Helmholtz frequency is substantially higher than the required drop repetition rates, i.e., more than 10 KHz and preferably more than 25 KHz. Since the Helmholtz frequency tends to be fairly well damped, ringing of the system at the frequency does not adversely affect the stability of drop formation process. Also, with the Helmholtz frequency substantially less than the length mode frequency, the fluid system is unable to respond to the length mode ringing of the transducer which tends to be poorly damped. This poorly damped length mode ringing can have an adverse affect on device performance when the fluid system is able to respond at the length mode frequency. This situation requires external damping of the transducer array, often with the effect of increasing the drive voltage which is not the case with the invention as described herein.

As utilized herein, the term elongated is intended to indicate that the length is greater than the width. In other words, the axis of elongation as utilized herein extends along the length which is greater than the transverse dimension across which the electric field is applied. Moreover, it will be appreciated that the particular transducer may be elongated in another direction which might be referred to as the depth and the overall depth may be greater than the length. It will, therefore, be understood that the term elongation is a relative term. Moreover, it will be understood that the transducer will expand and contract in other directions in addition to along the axis of elongation but such expansion and contraction is not of concern because it is not in the direction of coupling. In the embodiments shown herein, the axis of coupling is the axis of elongation. Accordingly, it will be understood that the length mode resonance is in the direction of coupling and, in the embodiments shown, does respresent the resonant frequency along the axis of elongation. However, the expansion and contraction will be sufficient along the axis of elongation so as to maximize the displacement of ink.

Althrough particular embodiments of the invention have been shown and described, it will be understood that various modifications may be made which will fall within the true spirit and scope of the invention as set forth in the appended claims.

I claim:

1. An ink jet apparatus comprising:

a variable volume chamber including an ink droplet ejecting orifice having a Helmholtz resonant frequency in excess of 10KHz and;

means for increasing the pressure in the chamber so as to eject a droplet of ink on demand over a range of operating frequencies; and said apparatus being characterized by at least one resonant frequency creating an upper limit for a frequency range of stable operation for said apparatus, said at least one resonant frequency exceeding 10 KHz.

2. The ink jet apparatus of claim 1 wherein said resonant frequency exceeds 25 KHz.

3. The ink jet apparatus of claim 1 wherein said resonant frequency lies within the range of 25 KHz to 50 KHz.

4. The ink jet apparatus of claim 1 wherein said resonant frequency is less than 100 KHz.

5. The jet apparatus of claim 1 wherein said resonant frequency permits the ejection of droplets of substantially equal velocity over a frequency range from zero to 5 KHz.

6. The ink jet apparatus of claim 1 wherein said resonant frequency permits the ejection of droplets at substantially equal velocity over a frequency range from zero to a frequency in excess of 5 KHz.

7. The ink jet apparatus of claim 1 wherein said resonant frequency permits the ejection of droplets at substantially equal velocity over a frequency range from zero to 7 KHz.

8. The ink jet apparatus of claim 1 wherein said resonant frequency permits the ejection of droplets of substantially equal size over a frequency range from zero to 5 KHz.

9. The ink jet apparatus of claim 1 wherein said resonant frequency permits the ejection of droplets of substantially equal size over a frequency range from zero to a frequency in excess of 5 KHz.

10.The ink jet apparatus of claim 1 wherein said resonant frequency permits the ejection of droplets of substantially equal size over a frequency range from zero to 7 KHz.

11. A method of operating a demand ink jet comprising an ink jet chamber and an orifice adapted to be filled with ink so as to form a meniscus in the orifice and eject droplets of ink from the said menicus, said chamber having a Helmholtz resonant frequency in excess of 10 KHz, said method comprising the following steps:

increasing the pressure within the chamber;

moving the meniscus forward through the orifice in response to the increase in pressure so as to form a droplet;

moving the droplet away from the meniscus in response to the increase in pressure so as to eject a droplet at a predetermined velocity; and repeating the aforesaid steps so as to eject additional droplets having substantially said predetermined velocity for frequencies of droplet ejection over a range from zero to 5 KHz.

12. The method of claim 11 wherein said substantially predetermined velocity is achieved for droplet ejection at frequencies in a range from zero to a frequency in excess of 5 KHz.

13. The method of claim 11 wherein said substantially predetermined velocity is achieved for droplet ejection at frequencies over a frequency range zero to 7 KHz.

14. A method of operating a demand ink jet comprising an ink jet chamber and an orifice adapted to be filled with ink so as to form a meniscus in the orifice and eject droplets of ink formed from said meniscus, said chamber having a Helmholtz resonant frequency in excess of 10 KHz, said method comprising the following steps:

increasing the pressure within the chamber;

moving the meniscus forward through the orifice in response to the increase in pressure so as to form a droplet;

moving the droplet away from the meniscus in response to the increase in pressure so as eject a droplet of predetermined size;

repeating the aforesaid steps so as to eject additional droplets in a series, each of said droplets having substantially the same predetermined size for frequencies of droplet ejection extending over a frequency range from zero to 5 KHz.

15. The method of claim 14 wherein the droplets projected are of substantially equal size over a frequency range from zero to frequency in excess of 5 KHz.

16. The method of claim 14 wherein the droplets Projected are of substantially equal size over a frequency range from zero to 7 KHz.

* * * * *